US012614837B2

(12) United States Patent　　　　　　　(10) Patent No.:　US 12,614,837 B2

Xiao et al.　　　　　　　　　　　　　　　(45) Date of Patent:　　　Apr. 28, 2026

(54) COMMUNICATION APPARATUS AND BASE STATION ANTENNA FEEDER SYSTEM

(71) Applicant: HUAWEI TECHNOLOGIES CO., LTD., Shenzhen (CN)

(72) Inventors: Weihong Xiao, Dongguan (CN);
Dingjiu Daojian, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 18/884,818

(22) Filed: Sep. 13, 2024

(65)　　　　Prior Publication Data

US 2025/0007150 A1　　Jan. 2, 2025

Related U.S. Application Data

(63) Continuation of application No. PCT/CN2023/081012, filed on Mar. 13, 2023.

(30)　　　Foreign Application Priority Data

Mar. 14, 2022　(CN) ......................... 202210249724.4

(51) Int. Cl.
*H01Q 1/24*　　　(2006.01)
*F03D 9/43*　　　(2016.01)
　　　(Continued)

(52) U.S. Cl.
CPC .............. *H01Q 1/246* (2013.01); *F03D 9/43*
(2016.05); *H01Q 19/12* (2013.01); *H02K*
*7/183* (2013.01); *F05B 2240/911* (2013.01)

(58) Field of Classification Search
CPC ...... H01Q 1/246; H01Q 19/12; H01Q 1/1207;
H01Q 1/24; H01Q 15/16; H01Q 1/36;
　　　(Continued)

(56)　　　　References Cited

U.S. PATENT DOCUMENTS

| | | | |
|---|---|---|---|
| 8,456,033 B2 * | 6/2013 | Halstead | ................... F03D 3/02 |
| | | | 290/55 |
| 2009/0086465 A1 * | 4/2009 | St-Germain | ........ G09F 15/0087 |
| | | | 362/89 |

(Continued)

FOREIGN PATENT DOCUMENTS

| | | |
|---|---|---|
| CN | 102427163 A | 4/2012 |
| CN | 105209753 A | 12/2015 |

(Continued)

OTHER PUBLICATIONS

Puchaski B.: "2.4GHz 30dBi Grid Antenna W/ Connector Pigtail", Sep. 27, 2011 (Sep. 27, 2011), XP093264141, total 1 page.

(Continued)

*Primary Examiner* — Seung H Lee
(74) *Attorney, Agent, or Firm* — HAUPTMAN HAM, LLP

(57)　　　　ABSTRACT

A communication apparatus includes a power generation assembly, wherein the power generation assembly includes a blade and a generator, and a rotating shaft of the blade is connected to the generator. The communication apparatus further includes an antenna, wherein the antenna includes a reflection plate and a radiation feed, the reflection plate is configured to reflect a signal of the radiation feed, the reflection plate has a hollow structure, a rotation radius of the blade is greater than a maximum distance between an outer edge of the reflection plate and a rotation axis of the blade. The communication apparatus further includes a fastening assembly, wherein the blade, the generator, and the antenna are mounted on the fastening assembly, and the fastening assembly is configured to mount the blade, the generator, and the antenna to a mounting bracket.

20 Claims, 9 Drawing Sheets

(51) Int. Cl.
  *H01Q 19/12* (2006.01)
  *H02K 7/18* (2006.01)
(58) Field of Classification Search
  CPC .. H01Q 1/12; H01Q 1/50; H01Q 1/52; H01Q
    15/14; H01Q 19/10; F03D 9/43; F03D
    9/00; F03D 1/06; F03D 7/0244; F03D
    9/11; H02K 7/183; F05B 2240/911
  See application file for complete search history.

(56) References Cited

U.S. PATENT DOCUMENTS

2010/0266412 A1  10/2010  Barber
2020/0313296 A1  10/2020  Mitchelson et al.

FOREIGN PATENT DOCUMENTS

CN   105804954 B   3/2018
CN   113314842 A   8/2021

OTHER PUBLICATIONS

Extended European Search Report issued in corresponding European Application No. 23769700.8, dated Apr. 25, 2025, pp. 1-11.
International Search Report issued in corresponding International Application No. PCT/CN2023/081012, dated Jun. 19, 2023, pp. 1-8.

* cited by examiner

122 ⟶

COMMUNICATION APPARATUS AND BASE STATION ANTENNA FEEDER SYSTEM

CROSS-REFERENCE TO RELATED APPLICATIONS

This application is a continuation of International Application No. PCT/CN2023/081012, filed on Mar. 13, 2023, which claims priority to Chinese Patent Application No. 202210249724.4, filed on Mar. 14, 2022. The disclosures of the aforementioned applications are hereby incorporated by reference in their entireties.

TECHNICAL FIELD

This application relates to the field of communication technologies, and in particular, to a communication apparatus and a base station antenna feeder system.

BACKGROUND

With the development of wireless communication technologies, a plurality of antennas has been widely used. In a development process of the wireless communication technologies, a microwave technology plays an increasing role. Conventional microwave antennas are mostly aperture antennas. Due to the impact of factors such as wind load, a volume, and a weight, it is a great challenge to obtain larger aperture space of the microwave antenna. Therefore, obtaining larger aperture space without causing too much negative impact of the factors such as the volume, the weight, and the wind load is a technical problem to be addressed in this field.

SUMMARY

This application provides a communication apparatus and a base station antenna feeder system, to increase aperture space of an antenna, and improve coverage benefits and capacity benefits of the antenna. The antenna and a power generation assembly reuse the aperture space, improving utilization of the aperture space. Wind energy is used to generate power, reducing carbon emissions and improving an effect of energy conservation and emission reduction.

According to a first aspect, this application provides a communication apparatus. The communication apparatus includes a power generation assembly, an antenna, and a fastening assembly. The power generation assembly includes a blade and a generator. A rotating shaft of the blade is connected to the generator. The blade rotates under an action of wind energy to drive the generator to generate power. The antenna includes a reflection plate and a radiation feed. The reflection plate is configured to reflect a signal of the radiation feed. The blade, the generator, and the antenna are mounted to the fastening assembly. The fastening assembly is configured to mount the blade, the generator, and the antenna to a mounting bracket. During specific mounting, the antenna and the blade are superposed, so that the blade and the antenna may share aperture space. To be specific, in same aperture space, both wireless communication of the antenna and wind power generation can be implemented, and space utilization and benefits are high. Specifically, the reflection plate has a hollow structure, so that wind can pass through the reflection plate to drive the blade to rotate, improving power generation efficiency of the power generation assembly. A rotation radius of the blade is greater than a maximum distance between an outer edge of the reflection plate and a rotation axis of the blade. An end of the blade and that is distal from the rotation axis of the blade extends to the outer edge of the reflection plate, so that a wind receiving effect of the end of the blade and that faces away from the rotation axis can be ensured, and the power generation assembly has good power generation efficiency. In this solution, the blade of the power generation assembly and the antenna share the aperture space, to implement reuse of an aperture, save the aperture space, and improve utilization and benefits of the aperture space. In addition, the power generation assembly uses the wind energy to generate power. This can reduce carbon emissions and improve an effect of energy conservation and emission reduction.

When the reflection plate is specifically disposed, the reflection plate has a centrosymmetric structure, and a symmetric center of the reflection plate is located on the rotation axis of the blade. The antenna and the blade cooperate with each other, so that force on the blade is even at each position.

When the communication apparatus is mounted, a position relationship between the blade, the reflection plate, and the radiation feed is not limited. In a technical solution, the blade, the reflection plate, and the radiation feed may be disposed in sequence along a direction away from the mounting bracket. The reflection plate is disposed adjacent to the radiation feed. This helps improve a reflection effect of the reflection plate on a signal, and reduce impact of an interference signal on the radiation feed. In another technical solution, the reflection plate, the blade, and the radiation feed may alternatively be disposed in sequence along a direction away from the mounting bracket. In both arrangements, the radiation feed is in front of the reflection plate.

To mount the blade and the antenna through the fastening assembly, the fastening assembly includes a fastening rod and a fastening rotating shaft. The fastening rotating shaft is coaxially connected to the fastening rod. Specifically, the fastening rotating shaft and the fastening rod are fastened relative to each other in an axial direction, and are rotatable relative to each other in a circumferential direction. The blade is mounted to the fastening rotating shaft through fastening. In this case, when the blade rotates, the fastening rotating shaft is driven to rotate relative to the fastening rod. If the antenna is fastened to the fastening rod, rotation of the blade does not affect the antenna.

A quantity of radiating elements included in the radiation feed is not limited. For example, in a technical solution, the radiation feed includes a single radiating element; and in another technical solution, the radiation feed may alternatively include at least two radiating elements.

The radiation feed in this technical solution may perform single frequency band communication, or may perform communication in at least two frequency bands. For example, the radiation feed includes a first radiating element and a second radiating element. A working frequency band of the first radiating element is different from a working frequency band of the second radiating element. The antenna may work in different radiation frequency bands, and support communication systems of different standards.

When the reflection plate is specifically prepared, a specific structure of the hollow structure of the reflection plate is not limited. In a technical solution, the hollow structure of the reflection plate is a plurality of through holes evenly arranged, so that wind passing through the reflection plate is even.

In another technical solution, the hollow structure may include a plurality of through holes, and a size of the through hole increases as a distance between the through hole and the rotation axis of the blade increases. A region in which the blade is farther away from the rotation axis has greater wind force, so that power generation efficiency of the power generation assembly is improved.

When the power generation assembly is disposed, a quantity of blades of the power generation assembly is not limited. For example, three blades or more blades may be included. A plurality of blades may be evenly distributed to improve force uniformity of the power generation assembly.

A material of the blade may be selected based on design specifications. For example, the blade may be a blade made of a metal material, to improve strength of the blade and improve a service life of the blade. Alternatively, the blade may be a blade made of a dielectric material, to reduce impact of the blade on an antenna signal.

The power generation assembly may further include a speed changing apparatus. The speed changing apparatus is connected to the rotating shaft of the blade, and is located between the blade and the generator. The speed changing apparatus is configured to adjust a rotation speed transmitted from the rotating shaft of the blade to the generator, and then transmit the rotation speed to the generator for power generation. This can make a power generation rate of the generator stable, and help improve the power generation efficiency.

The power generation assembly may further include a braking apparatus. The braking apparatus is connected to the rotating shaft of the blade, and is located between the blade and the generator. The braking apparatus is configured to brake the rotation of the blade. For example, when wind is excessively strong, to reduce a risk of damage on the blade, the blade is braked, to improve the service life of the blade.

In addition, the power generation assembly may further include a power storage apparatus and a power management apparatus. The power storage apparatus is electrically connected to the generator, and is configured to store power generated by the generator. The power management apparatus is electrically connected to the power storage apparatus and the generator separately, and is configured to control the power generated by the generator to be stored in the power storage apparatus, supply power to another device connected to the generator, control a purpose of the power stored in the power storage apparatus, or the like.

The power generation assembly is electrically connected to the antenna, and is configured to supply power to the antenna. In at least one embodiment, power generated by the power generation assembly in the communication apparatus is directly provided to the antenna. This can reduce carbon emissions in the field of wireless communication and reduce consumption of non-renewable resources. In normal working states of the power generation assembly and the antenna, the power generated by the power generation assembly is sufficient to support normal running of the antenna. In remote areas, the antenna may not be connected to external power, which greatly reduces costs.

The fastening assembly may include a connecting rod, and the connecting rod is a hollow connecting rod. When the connecting rod is the hollow connecting rod, a weight of the fastening assembly can be reduced while it is ensured that the connecting rod has strong strength.

According to a second aspect, this application provides a base station antenna feeder system. The base station antenna feeder system includes a mounting bracket and the communication apparatus according to the first aspect. The communication apparatus is mounted to the mounting bracket. An antenna of the base station antenna feeder system has large aperture space, and coverage benefits and capacity benefits of the antenna are high. In addition, reuse of the aperture space by the antenna and the power generation assembly is implemented, improving utilization of the aperture space. Wind energy is used to generate power, reducing carbon emissions and improving an effect of energy conservation and emission reduction.

REFERENCE NUMERALS

1—Communication apparatus;
11—Antenna;
111—Reflection plate;
1111—Hollow structure;
112—Radiation feed;
12—Fastening assembly;
121—Fastening rod;
1211—Circular hole;
122—Fastening rotating shaft;
1221—Circular shaft;
13—Power generation assembly;
131—Blade;
1311—Rotating shaft;
1312—Rotation axis;

1313—Rotation surface;

132—Generator;

133—Speed changing apparatus;

134—Braking apparatus;

135—Power storage apparatus;

136—Power management apparatus;

2—Mounting bracket;

3—Remote radio unit;

4—Baseband processing unit;

5—Transmission line;

r—Rotation radius; and

L—First distance.

DESCRIPTION OF EMBODIMENTS

Figure 1:
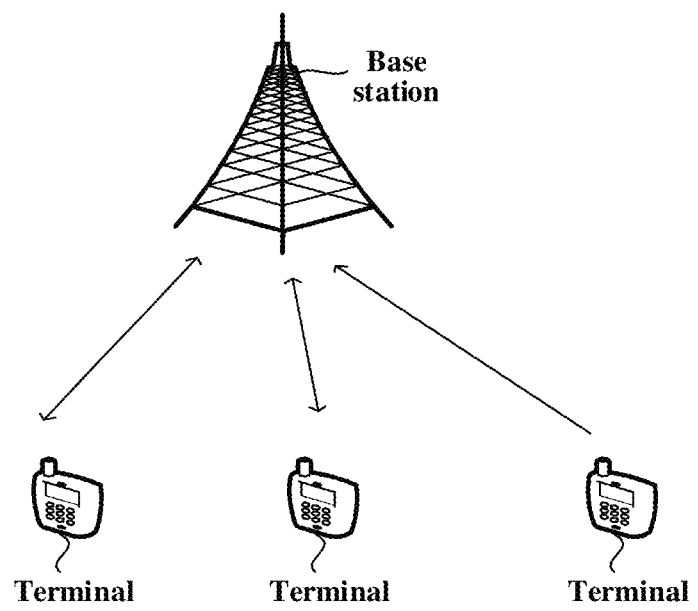
FIG. 1 is a diagram of a system architecture to which at least one embodiment of this application is applicable.

To facilitate understanding of a communication apparatus and a base station antenna feeder system provided in embodiments of this application, the following describes an application scenario of the communication apparatus and the base station antenna feeder system. FIG. 1 is a diagram of a system architecture to which at least one embodiment of this application is applicable. As shown in FIG. 1, the application scenario may include a base station antenna feeder system and a terminal. Wireless communication may be implemented between the base station antenna feeder system and the terminal. The base station antenna feeder system may also be referred to as an access network device, may be located in a base station subsystem (base station subsystem, BSS), a terrestrial radio access network (UTRAN), or an evolved terrestrial radio access network (E-UTRAN), and is configured to perform cell coverage of a radio signal, to implement communication between the terminal device and a wireless network. Specifically, the base station antenna feeder system may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB, or eNodeB) in a long term evolution (LTE) system, or may be a radio controller in a cloud radio access network (CRAN) scenario. Alternatively, the base station antenna feeder system may be a relay station, an access point, a vehicle-mounted device, a wearable device, a g node (gNodeB or gNB) in a new radio (NR) system, a base station antenna feeder system in a future evolved network, or the like. This is not limited in embodiments of this application.

Figure 2:
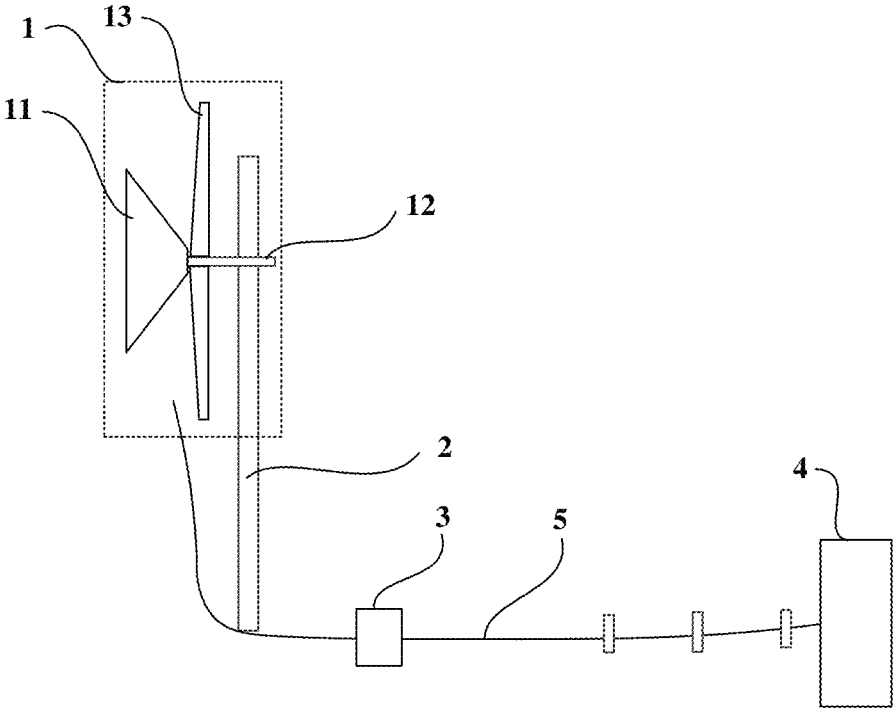
FIG. 2 is a diagram of a structure of a base station antenna feeder system according to at least one embodiment of this application.

FIG. 2 is a diagram of a structure of a base station antenna feeder system according to at least one embodiment of this application. As shown in FIG. 2, the base station antenna feeder system may include structures such as a communication apparatus 1 and a mounting bracket 2. The communication apparatus 1 specifically includes an antenna 11, a fastening assembly 12, and a power generation assembly 13. The antenna 11 and the power generation assembly 13 may be mounted to the mounting bracket 2 through the fastening assembly 12, to facilitate signal receiving or transmitting of the antenna 11 of the communication apparatus 1, and the power generation assembly uses wind energy to generate power. Specifically, the mounting bracket 2 may be a pole, an iron tower, or the like.

In addition, the base station antenna feeder system may further include a remote radio unit 3 and a baseband processing unit 4. The baseband processing unit 4 may be connected to the communication apparatus 1 through the remote radio unit 3 (RRU), and the baseband processing unit 4 may also be referred to as a baseband unit (BBU).

Figure 3:
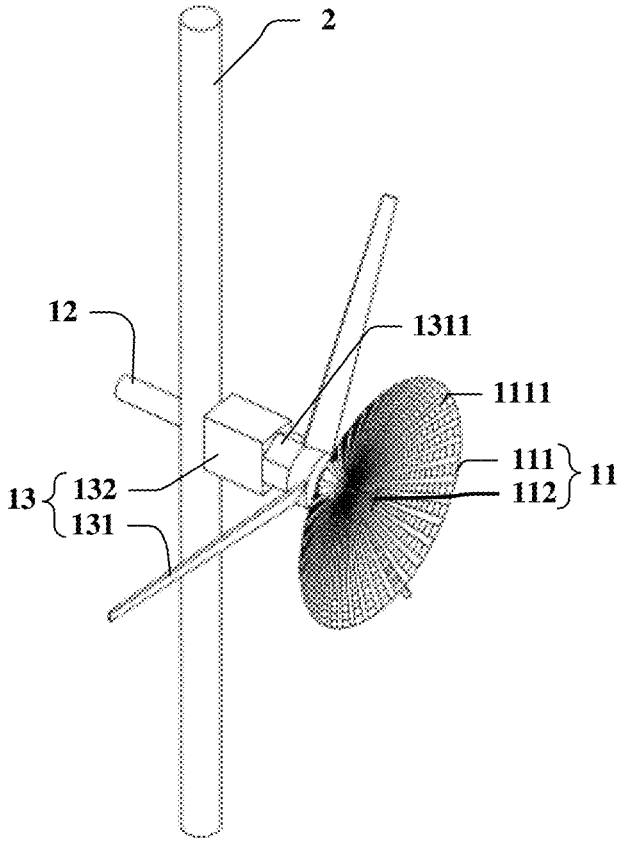
FIG. 3 is a diagram of a three-dimensional view of a communication apparatus according to at least one embodiment of this application.
Figure 4:
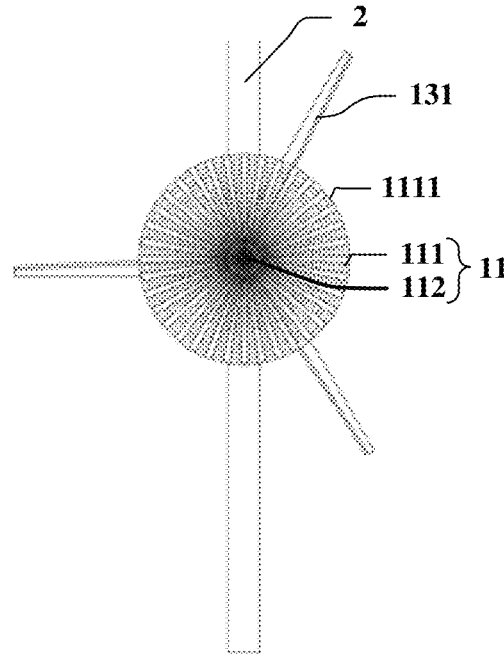
FIG. 4 is a diagram of a front view of a communication apparatus according to at least one embodiment of this application.
Figures 5, 6:
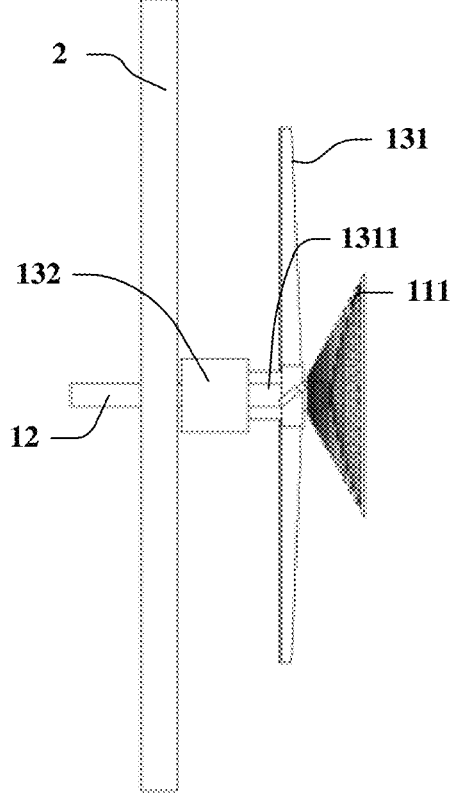
FIG. 5 is a diagram of a side view of a communication apparatus according to at least one embodiment of this application.
FIG. 6 is another diagram of a front view of a communication apparatus according to at least one embodiment of this application.

In at least one embodiment, as shown in FIG. 2, both the remote radio unit 3 and the baseband processing unit 4 may also be located at a remote end of the antenna 11. The remote radio unit 3 and the baseband processing unit 4 may be connected through a transmission line 5. FIG. 3 is a diagram of a three-dimensional view of a communication apparatus according to at least one embodiment of this application. FIG. 4 is a diagram of a front view of a communication apparatus according to at least one embodiment of this application. FIG. 5 is a diagram of a side via of a communication apparatus according to at least one embodiment of this application. As shown in FIG. 3 to FIG. 5, in at least one embodiment, a communication apparatus 1 includes a power generation assembly 13, an antenna 11, and a fastening assembly 12. Specifically, the power generation assembly 13 includes a blade 131 and a generator 132. A rotating shaft 1311 of the blade 131 is connected to the generator 132. The blade 131 rotates under an action of wind force, and the rotating shaft 1311 rotates synchronously with the blade 131. In this case, the rotating shaft 1311 may be used to transfer kinetic energy generated by rotation of the blade 131 to the generator 132, to drive a rotor of the generator 132 to rotate, so that the generator 132 generates power, to implement a wind power generation function of the power generation assembly 13. The blade 131, the generator 132, and the antenna 11 are mounted to the fastening assembly 12. Then the blade 131, the generator 132, and the antenna 11 are mounted to a mounting bracket 2 through the fastening assembly 12.

In some implementations, the antenna 11 is a microwave antenna. The antenna 11 includes a reflection plate 111 and a radiation feed 112. The radiation feed 112 is configured to send or receive an antenna signal. The reflection plate 111 may also be referred to as a bottom plate, an antenna panel, a reflection surface, or the like, and may be made of a metal material. When the antenna 11 receives a signal, the reflection plate 111 may reflect and aggregate the signal to the antenna 11 at a reception point. When the antenna 11 transmits signals, a part of the signals propagate in a direction away from the reflection plate 111, and a part of the signals propagate in a direction toward the reflection plate 111. The reflection plate 111 reflects a part of the signals propagating to the reflection plate 111 and transmits the signal in the direction away from the reflection plate 111. The radiation feed 112 is usually placed on a surface of one side of the reflection plate 111. This not only can greatly enhances a signal receiving or transmitting capability of the antenna 11, but also can block and shield interference of another electromagnetic wave from a back surface of the reflection plate 111 (in this application, the back surface of the reflection plate 111 is a side opposite to a side that is of the reflection plate 111 and that is used to dispose the radiation feed 112) on signal receiving of the antenna 11.

FIG. 6 is a diagram of a front view of a communication apparatus according to at least one embodiment of this application. As shown in FIG. 6, to describe a position relationship between an antenna 11 and a blade 131 in at least one embodiment of this application, two size parameters are defined below. In a rotation process of the blade, a rotation trajectory of the blade forms a circular rotation surface, and a radius of the rotation surface is a rotation radius r. Specifically, a distance between an edge that is of the blade 131 and that faces away from a rotation axis 1312 of the blade 131 and the rotation axis 1312 is a rotation radius r of the blade 131. Because an edge that is of a reflection plate 111 and that faces away from the rotation axis 1312 may be irregular, and the reflection plate 111 and the blade 131 may not be concentrically disposed, distances between different edges of the reflection plate 111 and the rotation axis 1312 are different. In this case, a maximum distance between the edge that is of the reflection plate 111 and that faces away from the rotation axis 1312 and the rotation axis 1312 is a first distance L.

With reference to FIG. 3 to FIG. 6, when the communication apparatus is specifically disposed, the rotation radius r of the blade 131 is greater than a maximum distance between an outer edge of the reflection plate 111 and the rotation axis 1312 of the blade 131, that is, the rotation radius r is greater than the first distance L. A projection of the reflection plate 111 on a rotation surface 1313 of the blade 131 is completely located in the rotation surface 1313 of the blade 131. In other words, the blade 131 and the reflection plate 111 are superposed, and the blade 131 and the reflection plate 111 share aperture space. The reflection plate 111 has a hollow structure 1111, so that a windproof effect of the reflection plate 111 can be reduced, to improve a working effect of the blade 131. In addition, an end that is of the blade 131 and that is distal from the rotation axis 1312 of the blade 131 extends to the outer edge of the reflection plate 111, that is, the end of the blade 131 is not blocked by the reflection plate 111. A region in which the blade 131 is farther away from the rotation axis 1312 has higher efficiency of converting wind energy into electric energy. Therefore, this solution can further improve a wind receiving effect of the end that is of the blade 131 and that faces away from the rotation axis 1312, so that the power generation assembly 13 has good power generation efficiency. Because a size of the blade 131 is large, the antenna 11 may have large disposing space. The hollow structure 1111 of the reflection plate 111 of the antenna is designed, so that wind load can be reduced. An area of the reflection plate 111 is increased, so that coverage benefits and capacity benefits of the antenna can be improved. Aperture space occupied by the reflection plate 111 is reused for wind power generation, causing reduced waste. In some embodiments of this application, the blade 131 of the power generation assembly 13 and the antenna 11 may share the aperture space, to implement reuse of an aperture, save the aperture space, and improve utilization and benefits of the aperture space. In addition, the power generation assembly 13 uses the wind energy to generate power. Because the wind energy is clean energy, carbon emissions can be reduced and an effect of energy conservation and emission reduction is improved.

In at least one embodiment, still refer to FIG. 3 to FIG. 6. The reflection plate 111 of the antenna 11 has a symmetric structure. For example, a shape of the outer edge of the reflection plate 111 of the antenna 11 may be a circle or a regular polygon. In this way, the wind load on the antenna 11 is symmetric, and the antenna 11 is not easily damaged due to uneven force, to help prolong a service life of the antenna 11. In addition, when the reflection plate 111 of the antenna 11 has a centrosymmetric structure, a symmetric center of the antenna 11 is located on the rotation axis 1312 of the blade 131. It is equivalent to describing that the blade 131 and the antenna 11 are concentrically disposed, and reflection plate 111 and the blade 131 are concentrically disposed. When the reflection plate 111 of the antenna 11 blocks some wind, the antenna 11 and the blade 131 cooperate with each other, so that force on the blade 131 is even at various positions.

The antenna in some embodiments of this application may be a microwave antenna, and the reflection plate 111 may be specifically umbrella-shaped, parabolic, hemisphere-shaped, horn-shaped, or the like. A shape of a cross section of the reflection plate 111 may be a circle, a rectangle, or a square. The reflection plate 111 may aggregate a radiation signal on the radiation feed 112. Specifically, the radiation feed 112 is located at a reflection center of the reflection plate.

Figure 7:
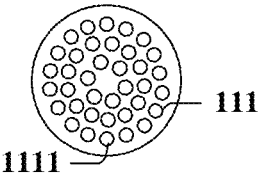
FIG. 7 is a diagram of a reflection plate according to at least one embodiment of this application.

FIG. 7 is a diagram of a reflection plate according to at least one embodiment of this application. As shown in FIG. 7, when a hollow structure 1111 of the reflection plate 111 is specifically implemented, in at least one embodiment, the hollow structure 1111 may be a plurality of through holes evenly arranged, so that wind passing through the reflection plate 111 is even.

Figure 8:
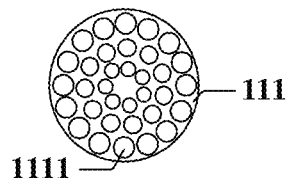
FIG. 8 is a diagram of a reflection plate according to at least one embodiment of this application.

FIG. 8 is a diagram of a reflection plate according to at least one embodiment of this application. As shown in FIG. 8, in at least one embodiment, a hollow structure 1111 may include a plurality of through holes, and a size of the through hole increases as a distance between the through hole and a rotation axis 1312 of a blade 131 increases. In this design manner of the through hole, a region in which the blade 131 is farther away from the rotation axis 1312 has greater wind force, so that power generation efficiency of a power generation assembly 13 is improved.

A specific structure of the radiation feed 112 in the foregoing embodiments is not limited in this application. One radiation feed 112 may be one radiating element, and performs single-frequency signal communication. Alternatively, at least two radiating elements may be included, and working frequency bands of different radiating elements may be the same or may be different. This is not limited in this application.

In at least one embodiment, the radiation feed 112 may include a first radiating element and a second radiating element, and a working frequency band of the first radiating element is different from a working frequency band of the second radiating element. The antenna 11 in this embodiment may work in different radiation frequency bands, and support communication systems of different standards, for example, support communication of a time division duplex or frequency division duplex standard.

In at least one embodiment, the radiating element of the radiation feed 112 may be a single-polarized radiating element, or may be a dual-polarized radiating element. This is not limited in this application.

Figure 9:
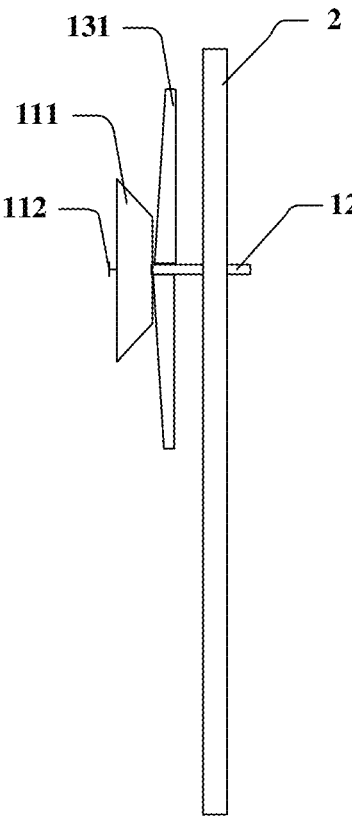
FIG. 9 is a diagram of a side view of a communication apparatus according to at least one embodiment of this application.

FIG. 9 is a diagram of a side view of a communication apparatus according to at least one embodiment of this application. As shown in FIG. 9, in at least one embodiment, a blade 131, a reflection plate 111, and a radiation feed 112 may be disposed in sequence along a direction away from a mounting bracket 2. To be specific, the radiation feed 112 and the reflection plate 111 are disposed on a same side of the blade 131, to reduce impact of the blade 131 on a radiation signal of an antenna. In addition, it is also convenient to mount the communication apparatus. For example, the radiation feed 112 and the reflection plate 111 may be first mounted into an antenna of an integrated structure, and then the antenna and the blade 131 are mounted into an integrated structure, or the antenna and the blade 131 are separately mounted to the mounting bracket 2 through a fastening assembly 12.

Figure 10:
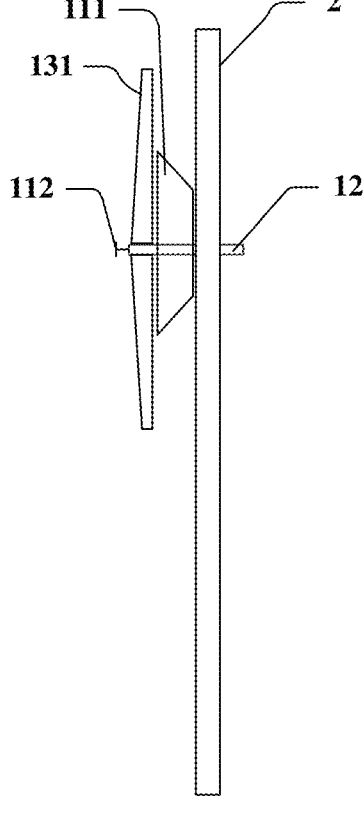
FIG. 10 is another diagram of a side view of a communication apparatus according to at least one embodiment of this application.

FIG. 10 is a diagram of a side view of a communication apparatus according to at least one embodiment of this application. As shown in FIG. 10, a reflection plate 111 and a radiation feed 112 may alternatively be disposed on two sides of a blade 131. In other words, the reflection plate 111, the blade 131, and the radiation feed 112 are disposed in sequence along a direction away from a mounting bracket 2. In conclusion, the radiation feed 112 is located at the forefront, to ensure normal working of the radiation feed 112. In addition, possible interference between the radiation feed 112 and another structure can be reduced.

Figure 11:
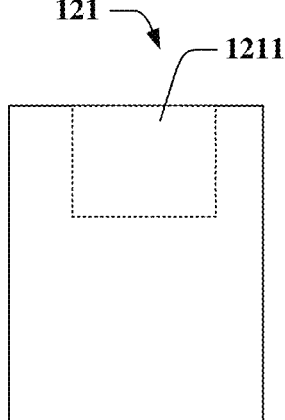
FIG. 11 is a diagram of a fastening rod according to at least one embodiment of this application.
Figure 12:
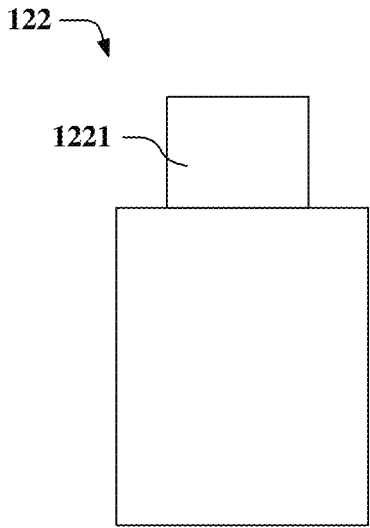
FIG. 12 is a diagram of a fastening rotating shaft according to at least one embodiment of this application.
Figure 13:
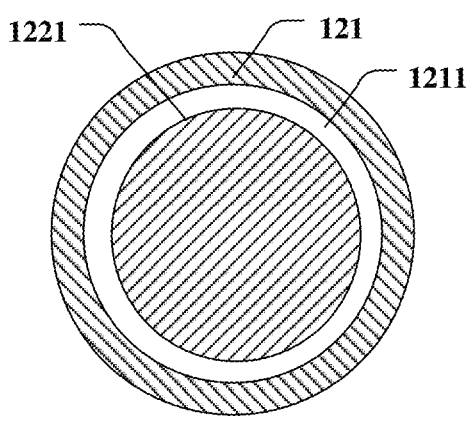
FIG. 13 is a diagram of a partial cross-sectional view of a fastening assembly according to at least one embodiment of this application.

FIG. 11 is a diagram of a fastening rod according to at least one embodiment of this application. FIG. 12 is a diagram of a fastening rotating shaft according to at least one embodiment of this application. FIG. 13 is a diagram of a partial cross-sectional view of a fastening assembly according to at least one embodiment of this application. As shown in FIG. 11 to FIG. 13, the fastening assembly 12 may include the fastening rod 121 and the fastening rotating shaft 122, and the fastening rod 121 is rotatably connected to the fastening rotating shaft 122. Specifically, the fastening rod 121 and the fastening rotating shaft 122 may be sleeved. The fastening rod 121 and the fastening rotating shaft 122 are rotatable relative to each other in a circumferential direction, and are fastened relative to each other in an axial direction. For example, as shown in FIG. 11, the fastening rod 121 may have a circular hole 1211 for mounting the fastening rotating shaft 122. As shown in FIG. 12, the fastening rotating shaft 122 may have a circular shaft 1221 that adapts to the circular hole 1211. As shown in FIG. 13, the circular shaft 1221 of the fastening rotating shaft 122 is disposed in the circular hole 1211 of the fastening rod 121, so that the fastening rotating shaft 122 rotates relative to the fastening rod 121.

For another example, in at least one embodiment, the fastening rod 121 has a circular shaft for mounting the fastening rotating shaft 122, the fastening rotating shaft 122 has a circular hole that adapts to the circular shaft, and the circular shaft of the fastening rod 121 is disposed in the circular hole of the fastening rotating shaft 122, so that the fastening rotating shaft 122 rotates relative to the fastening rod 121.

In addition, a fitting for use in cooperation such as a bearing may be disposed between the fastening rod 121 and the fastening rotating shaft 122. This is not limited in this application.

In at least one embodiment, the fastening rod 121 may be mounted to a mounting bracket 2 through fastening, and a blade 131 may be mounted to the fastening rotating shaft 122 through fastening. In this case, when the blade 131 rotates driven by wind energy, the fastening rotating shaft 122 is driven to rotate relative to the fastening rod 121, that is, is rotatable relative to the mounting bracket 2. It should be noted that, a specific manner in which the blade 131 is mounted to the fastening rotating shaft 122 through fastening is not limited. The blade 131 may be directly fastened to the fastening rotating shaft 122, or the fastening rotating shaft 122 may be fastened to the blade 131 through another structure such as a connecting rod. An antenna 11 is mounted to the fastening rod 121 through fastening, so that the antenna 11 may be fastened relative to the mounting bracket 2, and is not affected by rotation of the blade 131. It should be noted that, a specific manner in which the antenna 11 is mounted to the fastening rod 121 through fastening is not limited. The antenna 11 may be directly fastened to the fastening rod 121, or the fastening rod 121 may be fastened to the antenna 11 through another structure such as a connecting rod.

In addition, it may be understood that the fastening assembly 12 may include a plurality of parts, for example, a first part that is rotatably connected to the blade 131, a second part that is connected to the antenna 11, and a third part that is connected to the first part and the second part. The foregoing parts may include a connecting rod, and the connecting rod is a hollow connecting rod. When the connecting rod is the hollow connecting rod, a weight of the fastening assembly 12 can be reduced while it is ensured that the connecting rod has strong strength.

In at least one embodiment, a shape of a cross section of the hollow connecting rod may be square-shaped, 2×1 grid-shaped, 2×2 grid-shaped, circular, elliptical, or the like.

In the at least one embodiment shown in FIG. 3, the power generation assembly 13 includes three blades 131. In another embodiment, the power generation assembly 13 may further include more blades 131. This is not limited in this application. In addition, the blades 131 of the power generation assembly 13 may be evenly distributed on a peripheral side of a rotating shaft 1311 of the blades 131, to improve force uniformity of the power generation assembly 13 and improve a power generation effect.

Selection of a material of the blade 131 is not limited in this application. In at least one embodiment, the blade 131 is a blade 131 made of a dielectric material, to reduce impact of the blade 131 on a radiation signal of the antenna 11. In addition, the blade 131 may alternatively be a blade 131 made of a metal material, to improve strength of the blade 131 and improve a service life of the blade 131.

The power generation assembly 13 may be electrically connected to the antenna 11, and is configured to supply power to the antenna 11. In at least one embodiment, power generated by the power generation assembly 13 in a communication apparatus 1 is directly provided to the antenna 11, so that a loss of the power in a storage and transmission process can be reduced, and utilization of the power generated by the power generation assembly 13 can be improved. In addition, dependence of the communication apparatus on other power can be reduced, power supplied from a remote end to the antenna 11 is reduced, and a loss of this part of the power in a transmission process is reduced. In conclusion, such a design can reduce carbon emissions in the field of wireless communication and reduce consumption of non-renewable resources. In normal working states of the power generation assembly 13 and the antenna, the power generated by the power generation assembly 13 is sufficient to support normal running of the antenna. In remote areas, the antenna may not be connected to external power, which greatly reduces costs.

Figure 14:
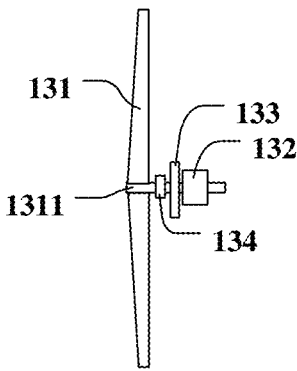
FIG. 14 is a diagram of a power generation assembly according to at least one embodiment of this application.

FIG. 14 is a diagram of a structure of a power generation assembly according to at least one embodiment of this application. As shown in FIG. 14, the power generation assembly 13 may further include a speed changing apparatus 133. The speed changing apparatus 133 is connected to a rotating shaft 1311 of a blade 131, and is configured to adjust a rotation speed of the blade 131, and then transmit the rotation speed to a generator 132 for power generation. This solution can make a power generation rate of the generator 132 stable, and help improve power generation efficiency.

Still refer to FIG. 14. In at least one embodiment, the power generation assembly 13 may further include a braking apparatus 134. The braking apparatus 134 is connected to the rotating shaft 1311 of the blade 131, and is configured to brake rotation of the blade 131. For example, when wind is excessively strong, to reduce a risk of damage on the blade 131, the blade 131 is braked, to improve a service life of the blade 131.

In at least one implementation, the blade 131, the braking apparatus 134, the speed changing apparatus 133, and the generator 132 are arranged in sequence relative to the rotating shaft 1311.

Figure 15:
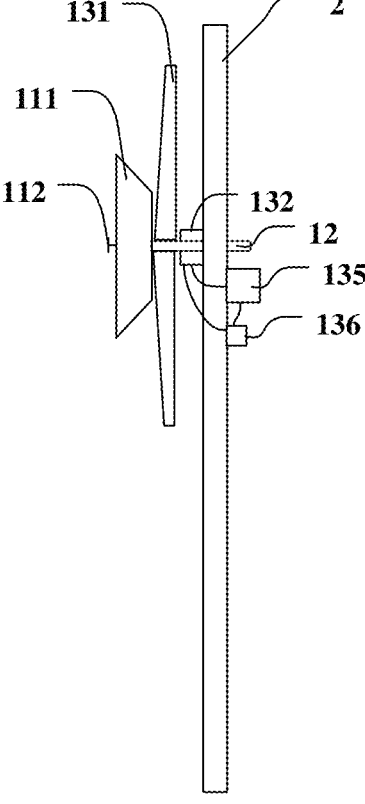
FIG. 15 is a diagram of a structure of a base station antenna feeder system according to at least one embodiment of this application.
Figure 16:
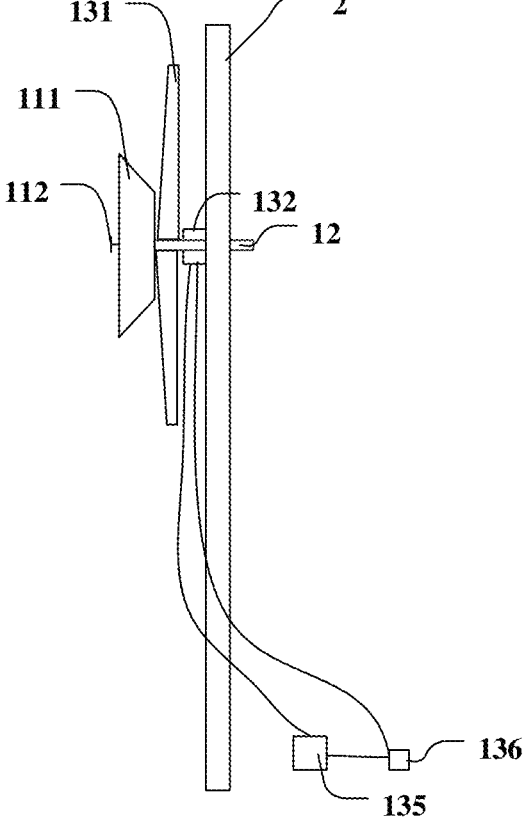
FIG. 16 is a diagram of a structure of a base station antenna feeder system according to at least one embodiment of this application.

FIG. 15 is a diagram of a structure of a base station antenna feeder system according to at least one embodiment of this application. FIG. 16 is a diagram of a structure of a base station antenna feeder system according to at least one embodiment of this application. As shown in FIG. 15 and FIG. 16, in at least one embodiment, the foregoing power generation assembly 13 may further include a power storage apparatus 135 and a power management apparatus 136. The power storage apparatus 135 is electrically connected to a generator 132, and is configured to store electric energy generated by the generator 132 and release the electric energy when the electric energy is needed. The foregoing power management apparatus 136 is electrically connected to the power storage apparatus 135 and the generator 132. Specifically, the power management apparatus 136 may control power generated by the generator 132 to be stored in the power storage apparatus 135, supply power to another device connected to the generator 132, or control a purpose of the power stored in the power storage apparatus 135.

It should be noted that specific positions of the power storage apparatus 135 and the power management apparatus 136 are not limited in this application. For example, as shown in FIG. 15, in a specific embodiment, the power storage apparatus 135 and the power management apparatus 136 may be disposed near an antenna 11, that is, at a high position of a mounting bracket 2, based on a requirement. As shown in FIG. 16, in another specific embodiment, the power storage apparatus 135 and the power management apparatus 136 may alternatively be disposed at a low position of a mounting bracket 2 or to the ground. Certainly, the power storage apparatus 135 and the power management apparatus 136 may be disposed at different positions. For example, the power storage apparatus 135 is disposed near the antenna 11, and the power management apparatus 136 is disposed at a low position of the mounting bracket 2 or to the ground; or the power management apparatus 136 is disposed near the antenna 11, and the power storage apparatus 135 is disposed at a low position of the mounting bracket 2 or to the ground.

Terms used in the foregoing embodiments are merely intended to describe specific embodiments, but are not intended to limit this application. The terms "one", "a", "the", "the foregoing", "this", and "the one" in singular forms used in this specification and the appended claims of this application are also intended to include expressions such as "one or more", unless otherwise specified in the context clearly.

Reference to "an embodiment", "a specific embodiment", or the like described in this specification means that one or more embodiments of this application include a specific feature, structure, or characteristic described with reference to this embodiment. The terms "include", "comprise", "have", and their variants all mean "include but are not limited to", unless otherwise specifically emphasized in another manner.

The foregoing embodiments may be independent embodiments, or may be combined. For example, technical features in at least two embodiments in embodiments are combined to form a new embodiment. This is not limited in this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus, comprising:
a power generation assembly, wherein the power generation assembly comprises a blade and a generator, and a rotating shaft of the blade is connected to the generator,
an antenna, wherein the antenna comprises a reflection plate and a radiation feed, the reflection plate is configured to reflect a signal of the radiation feed, the reflection plate has a hollow structure, a rotation radius of the blade is greater than a maximum distance between an outer edge of the reflection plate and a rotation axis of the blade, and
a fastening assembly, wherein the blade, the generator, and the antenna are mounted to the fastening assembly, and the fastening assembly is configured to mount the blade, the generator, and the antenna to a mounting bracket.

2. The communication apparatus according to claim 1, wherein the reflection plate has a centrosymmetric structure, and a symmetric center of the reflection plate is located on the rotation axis of the blade.

3. The communication apparatus according to claim 1, wherein the blade, the reflection plate, and the radiation feed are disposed in sequence along a direction away from the mounting bracket.

4. The communication apparatus according to claim 1, wherein the reflection plate, the blade, and the radiation feed are disposed in sequence along a direction away from the mounting bracket.

5. The communication apparatus according to claim 1, wherein the fastening assembly comprises a fastening rod and a fastening rotating shaft, the fastening rotating shaft is coaxially connected to the fastening rod, the blade is mounted to the fastening rotating shaft, and the antenna is fastened to the fastening rod.

6. The communication apparatus according to claim 1, wherein the radiation feed is a single radiating element.

7. The communication apparatus according to claim 1, wherein the radiation feed comprises a first radiating element and a second radiating element, and a working frequency band of the first radiating element is different from a working frequency band of the second radiating element.

8. The communication apparatus according to claim 1, wherein the hollow structure of the reflection plate comprises a plurality of through holes evenly arranged.

9. The communication apparatus according to claim 1, wherein a quantity of blades is three.

10. The communication apparatus according to claim 1, wherein the blade comprises a metal material or a dielectric material.

11. The communication apparatus according to claim 1, wherein the power generation assembly further comprises at least one of:
a speed changing apparatus connected to the rotating shaft of the blade; or
a braking apparatus connected to the rotating shaft of the blade.

12. The communication apparatus according to claim 1, wherein the power generation assembly further comprises a power storage apparatus and a power management apparatus, the power storage apparatus is electrically connected to the generator, and the power management apparatus is electrically connected to the power storage apparatus and the generator.

13. The communication apparatus according to claim 1, wherein the power generation assembly is electrically connected to the antenna, and is configured to supply power to the antenna.

14. The communication apparatus according to claim 1, wherein the fastening assembly comprises a hollow connecting rod.

15. A base station antenna feeder system, comprising:

a mounting bracket; and a communication apparatus, wherein the communication apparatus comprises:

a power generation assembly, wherein the power generation assembly comprises a blade and a generator, a rotating shaft of the blade is connected to the generator, an antenna, wherein the antenna comprises a reflection plate and a radiation feed, the reflection plate is configured to reflect a signal of the radiation feed, the reflection plate has a hollow structure, and a rotation radius of the blade is greater than a maximum distance between an outer edge of the reflection plate and a rotation axis of the blade, and a fastening assembly, wherein the blade, the generator, and the antenna are mounted to the fastening assembly, and the fastening assembly is configured to mount the blade, the generator, and the antenna to the mounting bracket.

16. The base station antenna feeder system according to claim 15, wherein the reflection plate has a centrosymmetric structure, and a symmetric center of the reflection plate is located on the rotation axis of the blade.

17. The base station antenna feeder system according to claim 15, wherein the blade, the reflection plate, and the radiation feed are disposed in sequence along a direction away from the mounting bracket.

18. The communication apparatus according to claim 15, wherein the reflection plate, the blade, and the radiation feed are disposed in sequence along a direction away from the mounting bracket.

19. The communication apparatus according to claim 15, wherein the fastening assembly comprises a fastening rod and a fastening rotating shaft, the fastening rotating shaft is coaxially connected to the fastening rod, the blade is mounted to the fastening rotating shaft through fastening, and the antenna is fastened to the fastening rod.

20. The communication apparatus according to claim 15, wherein the radiation feed is a single radiating element.

* * * * *